United States Patent
Liu et al.

(10) Patent No.: US 10,832,388 B2
(45) Date of Patent: Nov. 10, 2020

(54) IMAGE TUNING DEVICE AND METHOD

(71) Applicant: REALTEK SEMICONDUCTOR CORPORATION, Hsinchu (TW)

(72) Inventors: Jun-Zuo Liu, Yunlin County (TW); Tien-Hung Lin, New Taipei (TW); Ju-Wen Tseng, Taichung (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 92 days.

(21) Appl. No.: 16/207,251

(22) Filed: Dec. 3, 2018

(65) Prior Publication Data
US 2019/0172186 A1   Jun. 6, 2019

(30) Foreign Application Priority Data
Dec. 4, 2017  (TW) .............................. 106142437 A

(51) Int. Cl.
*G06T 5/00*  (2006.01)
*G06T 5/40*  (2006.01)

(52) U.S. Cl.
CPC .............. *G06T 5/009* (2013.01); *G06T 5/007* (2013.01); *G06T 5/40* (2013.01); *G06T 2207/20021* (2013.01); *G06T 2207/20024* (2013.01)

(58) Field of Classification Search
CPC . G06T 2207/20021; G06T 2207/20024; G06T 5/009; G06T 5/40
See application file for complete search history.

(56) References Cited

U.S. PATENT DOCUMENTS

| | | | |
|---|---|---|---|
| 9,800,793 B2 * | 10/2017 | Chang ................... | G06K 9/4661 |
| 2007/0092137 A1 * | 4/2007 | Zhao .......................... | G06T 3/40 |
| | | | 382/169 |
| 2008/0036870 A1 * | 2/2008 | Uezono .................. | H04N 9/045 |
| | | | 348/222.1 |

FOREIGN PATENT DOCUMENTS

TW       201725903 A       7/2017

OTHER PUBLICATIONS

OA letter of counterpart TW application of application No. 106142437 dated Dec. 13, 2013. Summary of the OA letter: Claims 1, 3-4, 6 are rejected as being unpatentable over the disclosure of the cited reference 1 (TW 201725903 A, also published as U.S. Pat. No. 9,800,793 B2) and the cited reference 2 (US 2007/0092137 A1).

* cited by examiner

*Primary Examiner* — John J Lee
(74) *Attorney, Agent, or Firm* — WPAT, PC

(57) ABSTRACT

Disclosed are an image tuning device and an image tuning method. The image tuning method includes the following steps: dividing an image area into a plurality of blocks for executing brightness adjustment individually, in which the blocks include a target block and at least one neighboring block; receiving pixel data of the target block to calculate a target block brightness value; receiving pixel data of the at least one neighboring block to calculate at least one neighboring block brightness value; calculating a calculated brightness value of a target pixel within the target block according to the target block brightness value and the at least one neighboring block brightness value; and generating an adjusted brightness value of the target pixel by adjusting an original brightness value of the target pixel according to the calculated brightness value.

20 Claims, 12 Drawing Sheets

| blk_neighbor | blk_neighbor | blk_neighbor |
|---|---|---|
| blk_neighbor | blk_target | blk_neighbor |
| blk_neighbor | blk_neighbor | blk_neighbor |

IMAGE TUNING DEVICE AND METHOD

BACKGROUND OF THE INVENTION

1. Field of the Invention

The present invention relates to image tuning, especially to image brightness tuning.

2. Description of Related Art

Generally, in order to adjust the brightness of an image, an algorithm is used to perform a brightness analysis of the whole image and then specific brightness curve adjustment is executed according to the average picture level (APL) of the whole image. For instance, for a dark image (e.g., an image of APL=10%), the dark image's brightness curve of the dark image's dark region is pulled up or elevated; for an medium bright image (e.g., an image of APL=50%), the medium bright image's brightness curve of the medium bright image's dark region is pulled down or dropped and the medium bright image's brightness curve of the medium bright image's bright region is pulled up or elevated; for a bright image (e.g., an image of APL=90%), the bright image's brightness curve of the bright image's bright region is pulled down or dropped. However, regarding an image of extremely low APL, the above-mentioned curve adjustment increases the brightness of the whole dark region of an image, but the brightness of some dark regions of the image may have no need to be increased since should be dark by nature. Thus the contrast of the image may be degraded after the curve adjustment.

SUMMARY OF THE INVENTION

An object of the present invention is to provide an image tuning device and an image tuning method capable of preventing the problems of the prior art.

The present invention discloses an image tuning device capable of dividing an image area into a plurality of blocks for executing brightness adjustment on the blocks individually, in which the blocks include a target block and at least one neighboring block. An embodiment of the image tuning device includes a brightness calculating circuit and a brightness adjusting circuit. The brightness calculating circuit includes: a block brightness calculating circuit configured to receive pixel data of the target block to calculate a target block brightness value of the target block and configured to receive pixel data of the at least one neighboring block to calculate at least one neighboring block brightness value of the at least one neighboring block; and a pixel brightness calculating circuit configured to calculate a calculated brightness value of a target pixel within the target block according to the target block brightness value and the at least one neighboring block brightness value. The brightness adjusting circuit is configured to generate an adjusted brightness value of the target pixel by adjusting an original brightness value of the target pixel according to the calculated brightness value of the target pixel.

The present invention also discloses an image tuning method. An embodiment of the method includes the following steps: dividing an image area into a plurality of blocks for executing brightness adjustment individually, in which the blocks include a target block and at least one neighboring block; receiving pixel data of the target block to calculate a target block brightness value; receiving pixel data of the at least one neighboring block to calculate at least one neighboring block brightness value; calculating a calculated brightness value of a target pixel within the target block according to the target block brightness value and the at least one neighboring block brightness value; and generating an adjusted brightness value of the target pixel by adjusting an original brightness value of the target pixel according to the calculated brightness value.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 2 shows an image area divided into a plurality of blocks.

FIG. 3b shows the brightness distribution of each block of the input image of FIG. 3a.

DETAILED DESCRIPTION OF THE PREFERRED EMBODIMENTS

The present invention discloses an image tuning device and an image tuning method capable of adjusting the brightness of an input image regionally so as to enhance the contrast of the input image.

Figure 1:
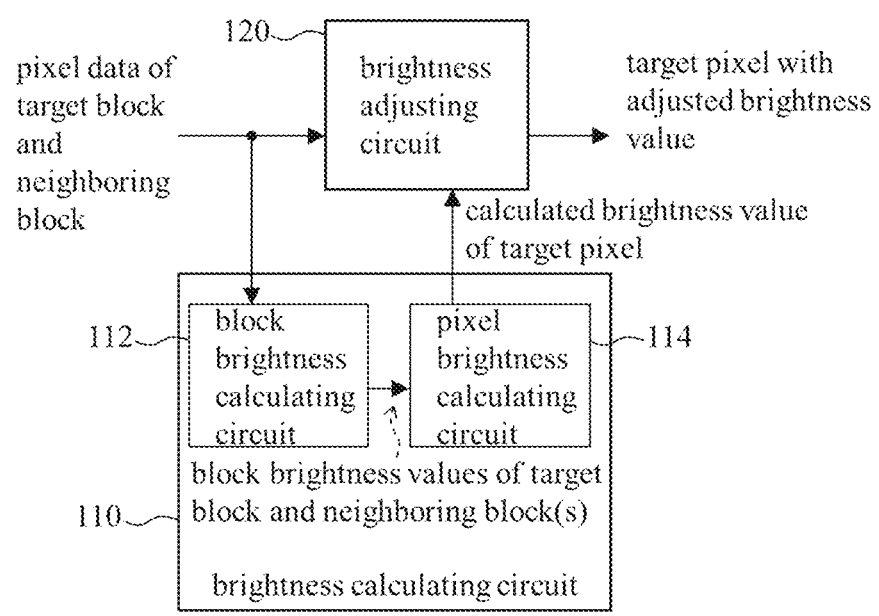
FIG. 1 shows an embodiment of the image tuning device of the present invention.

FIG. 1 shows an embodiment of the image tuning device of the present invention. The image tuning device 100 of FIG. 1 is capable of dividing an image area of an input image (e.g., the whole/partial visible area of the input image) into a plurality of blocks as shown in FIG. 2, so that the image tuning device 100 can adjust the brightness of each block individually. The blocks include a target block (e.g., the block "blk_target" as shown in FIG. 2) and at least one neighboring block (e.g., the blocks "blk_neighbor" as shown in FIG. 2). Each of the blocks includes a plurality of pixels of the input image, and the brightness of each pixel can be represented by a brightness value (e.g., $$\text{brightness value} = \frac{R + G + B}{3},$$

in which R, G and B are the brightness value of red color, the brightness value of green color and the brightness value of blue color respectively). When the image tuning device 100 adjusts the brightness value of a target pixel, the block where the target pixel is located is treated as the target block and the block(s) neighboring on the target block is/are treated as the at least one neighboring block. The target pixel can be any pixel in the aforementioned image area. It should be noted that the size of the image area and the amount of the total blocks can be set in accordance with the demand of implementation.

Please refer to FIG. 1. The image tuning device 100 includes a brightness calculating circuit 110 and a brightness adjusting circuit 120. The brightness calculating circuit 110 includes a block brightness calculating circuit 112 and a pixel brightness calculating circuit 114. The block brightness calculating circuit 112 is configured to receive pixel data of the target block to calculate a target block brightness value of the target block and the block brightness calculating circuit 112 is further configured to receive pixel data of the at least one neighboring block to calculate at least one neighboring block brightness value of the at least one neighboring block. The pixel brightness calculating circuit 114 is configured to calculate a calculated brightness value of the target pixel within the target block according to the target block brightness value and the at least one neighboring block brightness value. The brightness adjusting circuit 120 is configured to adjust an original brightness value of the target pixel according to the calculated brightness value of the target pixel and thereby generate an adjusted brightness value of the target pixel.

In an exemplary implementation, the block brightness calculating circuit 112 is configured to execute at least the following steps to obtain the target block brightness value: gathering statistics according to the pixel data of the target block to obtain a target block brightness distribution; finding out a target block maximum brightness value (i.e., the maximum of the brightness values of all the pixels in the target block) according to the pixel data of the target block; and executing a predetermined calculation according to the target block brightness distribution and the target block maximum brightness value to obtain the target block brightness value. Similarly, in an exemplary implementation, the block brightness calculating circuit 112 is configured to execute at the least following steps to obtain the at least one neighboring block brightness value: gathering statistics according to the pixel data of the at least one neighboring block to obtain at least one neighboring block brightness distribution; finding out at least one neighboring block maximum brightness value (i.e., the maximum of the brightness values of all the pixels in the at least one neighboring block) according to the pixel data of the at least one neighboring block; and executing the aforementioned predetermined calculation or another predetermined calculation according to the at least one neighboring block brightness distribution and the at least one neighboring block maximum brightness value to obtain the at least one neighboring block brightness value.

Figure 3A:
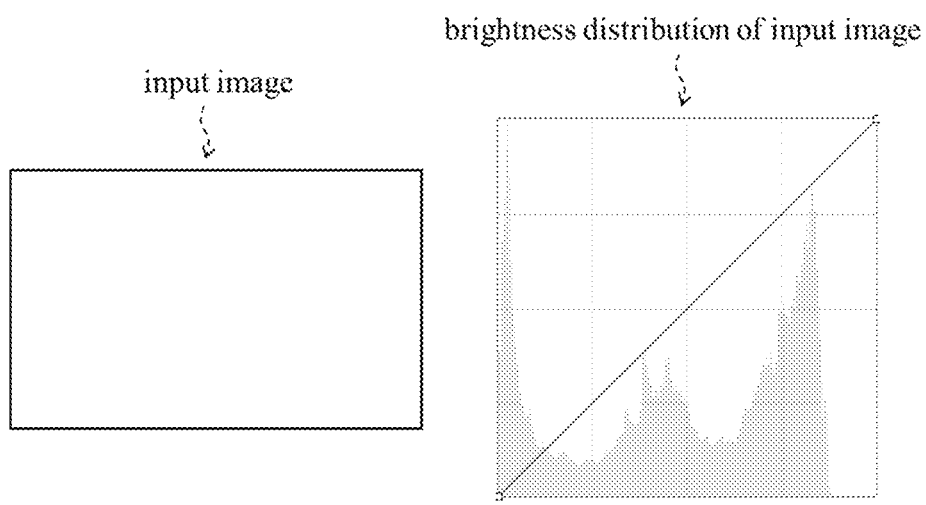
FIG. 3a shows the brightness distribution of an input image.
Figure 3B:
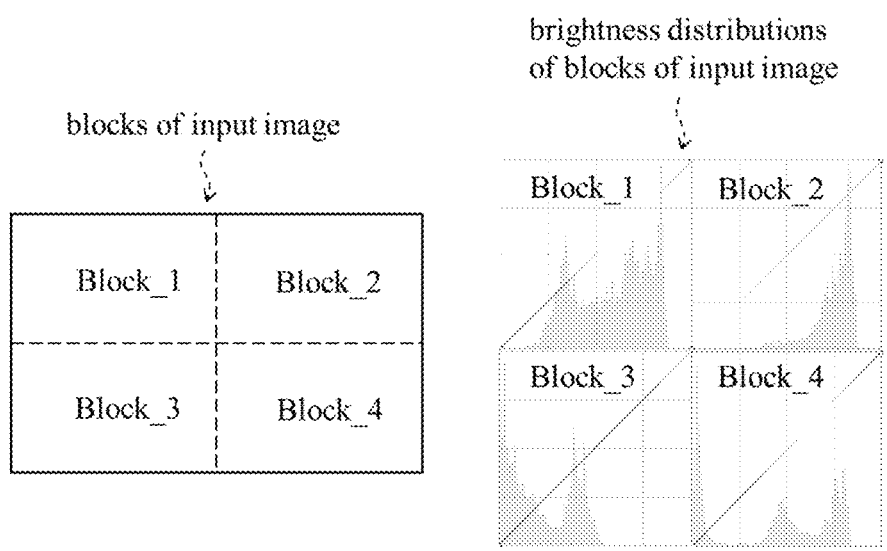

Each of the aforementioned block brightness distributions shows the number of pixels for each brightness value (e.g., each value between the brightness value 0 and the brightness value 255 (0~255)) in a block of the input image. An exemplary implementation of the block brightness distributions is shown by FIG. 3a and FIG. 3b. FIG. 3a shows an input image and the brightness distribution thereof; FIG. 3b shows the input image, that is divided into a plurality of blocks (i.e., Block_1, Block_2, Block_3 and Block_4), and the brightness distribution of each block. In FIG. 3a and FIG. 3b, the horizontal axis of each brightness distribution represents the input brightness values of the input image, the vertical axis of each brightness distribution represents the output brightness values of the input image, a histogram (which is in the form of a light-color line in FIG. 3a and FIG. 3b) of each brightness distribution represents the number of pixels of a certain input brightness value, and the diagonal of each brightness distribution represents an original brightness curve $$\left(\text{characterized by } \frac{\text{input brightness value}}{\text{output brightness value}} = 1\right).$$

According to FIG. 3a and FIG. 3b, the brightness distribution of the whole input image is different from the brightness distribution of each block, and the brightness distributions of any two blocks are different, in which most pixels in Block_2 of FIG. 3b are highly bright pixels while most pixels in Block_3 of FIG. 3b are dark pixels. Accordingly, in comparison with adjusting the brightness of the whole input image, adjusting the brightness of each block of the input image individually can achieve a better effect. In addition, the aforementioned predetermined calculation could be a known or a self-developed calculation; for instance, the brightness value of each block ($APL_{Local}$) (i.e., each of the target block brightness value and the at least one neighboring block brightness value) is obtained by the following equation:

$$APL_{Local} = \sum_{i=0}^{7} w_i \cdot H_i + w_{avg} \cdot A_{avg} + C_{max} \cdot B_{max}$$

In the above equation, each value of the variable "i" is associated with a histogram of a block's brightness distribution, $H_i$ is the statistic of a histogram of the block, $w_i$ is the weighted value of $H_i$, $w_{avg}$ is a block average brightness weighted value, $A_{avg}$ is a block average brightness value and $C_{max}$ is a special weighted value for the maximum brightness value $B_{max}$ of the block, in which the number of those pixels having the brightness value $B_{max}$ is greater than zero and $C_{max}$ can be set according to the demand of implementation.

In an exemplary implementation, the pixel brightness calculating circuit 114 executes at least the following steps to obtain the calculated brightness value of the target pixel: executing a predetermined calculation according to the target block brightness value and the at least one neighboring block brightness value to obtain the calculated brightness value of the target pixel. The said predetermined calculation is a known calculation (e.g., an interpolation calculation) or a self-developed calculation. For instance, the calculated brightness value is obtained by the following equation:

$$Y_{avg} = \sum_{j=P}^{Q} C_j \sum_{i=M}^{N} C_i \cdot blk[i][j]$$

Figure 4:
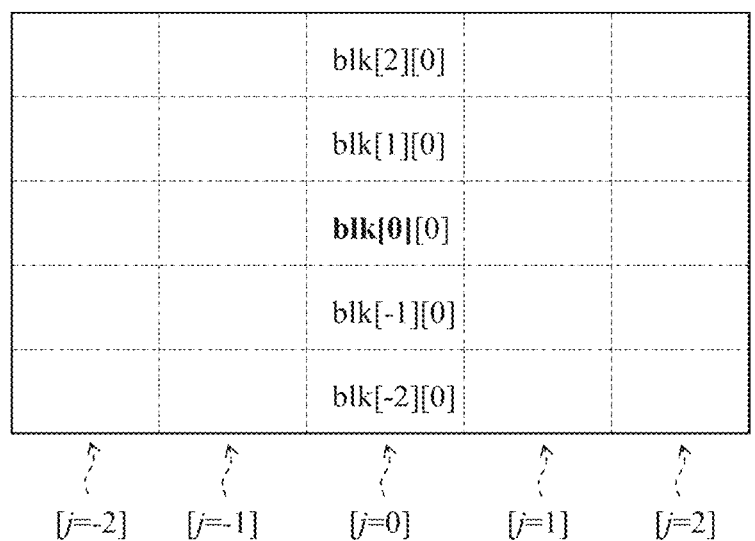
FIG. 4 shows how to obtain the calculated brightness value of a target pixel.

In the above equation, [i] is related to the vertical position of block blk[i][j]; for instance, as shown in FIG. 4, blk[0][0] is the target block, blk[1][0] is the closest block above the target block, blk[2][0] is the second close block above the target block, blk[4][0] is the closest block below the target block, blk[−2][0] is the second close block below the target block, and so on and so forth. $C_i$ in the equation is the block weighted value for block blk[i][j], in which the value of the variable "i" is between M and N; for instance, as shown in FIG. 4, the value of the variable "i" is between −2 and 2. [j] in the equation is the block average brightness value or the weighted brightness value for those blocks in the same vertical line; for instance, as shown in FIG. 4, the block average brightness value/the weighted brightness value for the blocks including the target block blk[0][0] in the same vertical line is U=01 while the block average brightness values/the weighted brightness values for the blocks in the other vertical lines parallel to the vertical line of [j=0] from left to right are [j=−2], [j=4], [j=1] and [j=2] respectively. $C_1$ in the equation is the weighted value of [j], in which the value of the variable "j" is between P and Q; for instance, as shown in FIG. 4, the value of the variable "j" is between −2 and 2. Each of the above-mentioned weighted value can be set according to the demand of implementation. In an exemplary implementation, the block weighted value $C_i=C_0$ for the target block blk[0][0] is greater than the block weighted value $C_i$ (i≠0) for any other blocks; the brightness weighted value $C_j=C_0$ for the brightness value [j=0] is greater than the brightness weighted value $C_j$ (j≠0) for any other brightness values; the block weighted value $C_i$ (i≠0) for block blk[i][j] is inversely proportional to the distance between block blk[i][j] and the target block blk[0][0]; and the brightness weighted value $C_j$ (j≠0) for the brightness value [j] is inversely proportional to the distance between block blk[i][j] and the target block blk[0][0].

Figure 5:
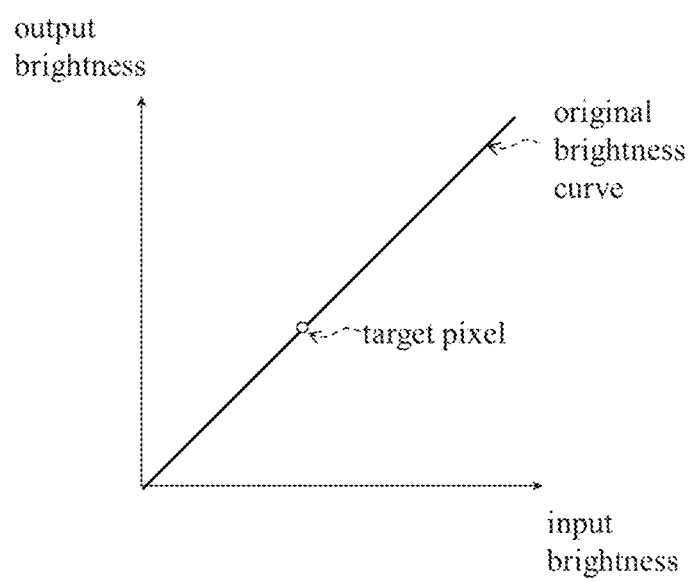
FIG. 5 shows the original brightness value of a target pixel located at a point on an original brightness curve.
Figure 6:
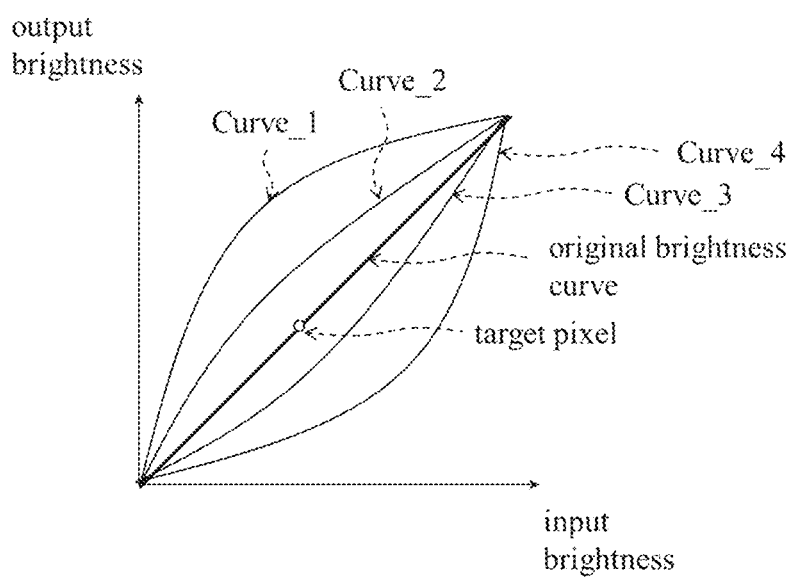
FIG. 6 shows a plurality of predetermined brightness curves.

In an exemplary implementation, the brightness adjusting circuit 120 carries out at least the following steps to generate the adjusted brightness value of the target pixel: selecting a brightness adjusting curve from a plurality of predetermined brightness curves according to the calculated brightness value of the target pixel; and adjusting the original brightness value of the target pixel by using the brightness adjusting curve so as to generate the adjusted brightness value of the target pixel. In this exemplary implementation, the horizontal axis in a drawing of a brightness curve represents the value of input brightness, and the vertical axis in the drawing of the brightness curve represents the value of output brightness. The aforementioned original brightness value of the target pixel is located at an original brightness curve as shown in FIG. 5. The curve of FIG. 5 indicates that the original brightness value (i.e., the value of input brightness) of the target pixel without adjustment will be equal to the value of output brightness (i.e., the brightness gain $$\left(\frac{\text{the value of output brightness value}}{\text{the value of input brightness value}}\right)$$

for the target pixel is one). In addition, FIG. 6 shows an exemplary implementation of the plurality of predetermined brightness curves. In FIG. 6, as the value of input brightness increases, the brightness gains of some of the predetermined brightness curves (i.e., Curve_1 and Curve_2) decrease, which implies that the brightness gains of these predetermined brightness curves are not less than 1

$$\left(\frac{\text{the value of output brightness value}}{\text{the value of input brightness value}} \geq 1\right);$$

as a result, Curve_1 and Curve_2 are suitable for improving the contrast of a dark region of an image. In addition, as the value of input brightness increases, the brightness gains of some of the predetermined brightness curves (i.e., Curve_3 and Curve_4) increase, which implies that the brightness gains of these predetermined brightness curves are not greater than 1

$$\left(\frac{\text{the value of output brightness value}}{\text{the value of input brightness value}} \leq 1\right);$$

as a result, Curve_3 and Curve_4 are suitable for improving the contrast of a bright region of an image. In light of the above, when the calculated brightness value of the target pixel is relatively small, which implies that the brightness of the target pixel is relatively low, the brightness adjusting circuit 120 can choose Curve_1 or Curve_2 according to the calculated brightness value to raise the brightness gain of the target pixel and thereby generate the adjusted brightness value (i.e., the value of output brightness of Curve_1 or Curve_2) of the target pixel. For instance, when the calculated brightness value is within a first numerical region, the brightness adjusting circuit 120 chooses Curve_1; when the calculated brightness value is within a second numerical region, the brightness adjusting circuit 120 chooses Curve_2. When the calculated brightness value of the target pixel is relatively large, which implies that the brightness of the target pixel is relatively high, the brightness adjusting circuit 120 can choose Curve_3 or Curve_4 according to the calculated brightness value to reduce the brightness gain of the target pixel and thereby generate the adjusted brightness value (i.e., the value of output brightness of Curve_3 or Curve_4) of the target pixel. For instance, when the calculated brightness value is within a third numerical region, the brightness adjusting circuit 120 chooses Curve_3; when the calculated brightness value is within a fourth numerical region, the brightness adjusting circuit 120 chooses Curve_4. The number of the predetermined brightness curves can be set according to the demand of implementation and then fixed, and the shape of each predetermined brightness curve and the relation between the calculated brightness value and the predetermined brightness curves can be set according to the demand of implementation. The aforementioned adjusted brightness value of the target pixel or the derivative thereof is treated as the output brightness value of the target pixel.

It should be noted that after reading the present disclosure, people of ordinary skill in the art can use well-known circuits (e.g., digital signal processor, microcontroller, look-up table, assembly of logic gates, etc.) to implement the brightness calculating circuit 110 and the brightness adjusting circuit 120.

Figure 7:
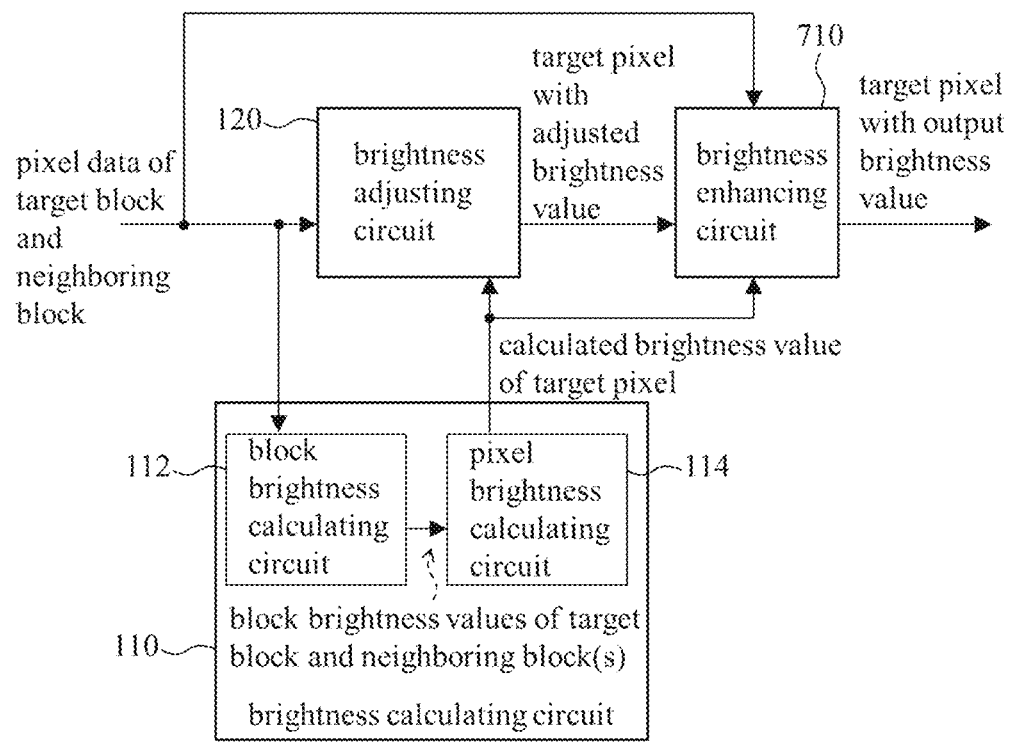
FIG. 7 shows another embodiment of the image tuning device of the present invention.

FIG. 7 shows another embodiment of the image tuning device of the present invention. In comparison with FIG. 1, the image tuning device 700 of FIG. 7 further includes: a brightness enhancing circuit 710 configured to generate the output brightness value of the target pixel according to the original brightness value of the target pixel, the calculated brightness value of the target pixel and the adjusted brightness value of the target pixel. In an exemplary implementation, the brightness enhancing circuit 710 executes at least the following steps to generate the output brightness value: calculating a brightness difference absolute value of a difference between the original brightness value and the calculated brightness value; and adjusting the adjusted brightness value according to the original brightness value and the brightness difference absolute value to generate the output brightness value. The adjusted brightness value can be adjusted in the following exemplary manner: obtaining an original brightness gain value according to the original brightness value, in which the original brightness gain value is inversely proportional to the original brightness value or their relation is prescribed according to the demand of implementation; obtaining a brightness difference gain value according to the brightness difference absolute value, in which the brightness difference gain value is inversely proportional to the brightness difference absolute value or their relation is prescribed according to the demand of implementation; and summing the adjusted brightness value, the original brightness gain value and the brightness difference gain value up to generate the output brightness value.

Figure 8:
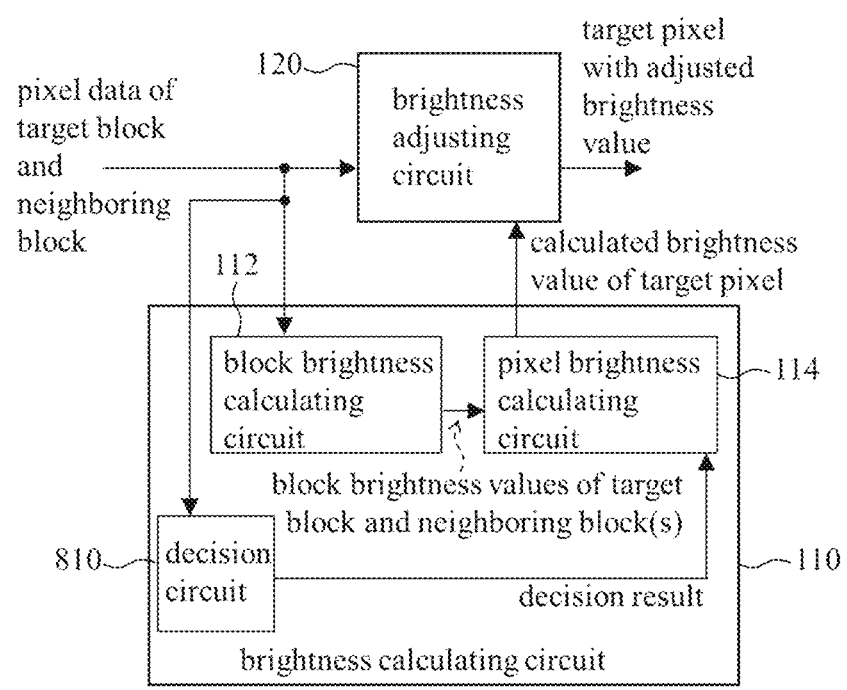
FIG. 8 shows another embodiment of the image tuning device of the present invention.

FIG. 8 shows another embodiment of the image tuning device of the present invention. In comparison with FIG. 1, the brightness calculating circuit 110 of FIG. 8 further includes: a decision circuit 810 (e.g., a known or self-developed edge detecting circuit) configured to determine whether the target pixel is located at a high frequency region (e.g., a region of significant brightness variation such as an edge of an object in an image) according to the pixel data of the target block (e.g., the pixel data of the target pixel and its surrounding pixels) so as to generate a decision result. In this embodiment, the brightness adjusting circuit 120 is configured to generate the adjusted brightness value of the target pixel according to the calculated brightness value and the decision result. For instance, when the decision result indicates that the target pixel is located at a high frequency region, the brightness adjusting circuit 120 restrains the extent of variation of the adjusted brightness value of the target pixel in view of the original brightness value of the target pixel. In an exemplary implementation, the brightness adjusting circuit 120 can choose a predetermined brightness curve of gradual slope (e.g., Curve_2 or Curve_3 of FIG. 6) according to the calculated brightness value and the decision result to adjust the original brightness value of the target pixel and thereby obtain the adjusted brightness value.

Figure 9:
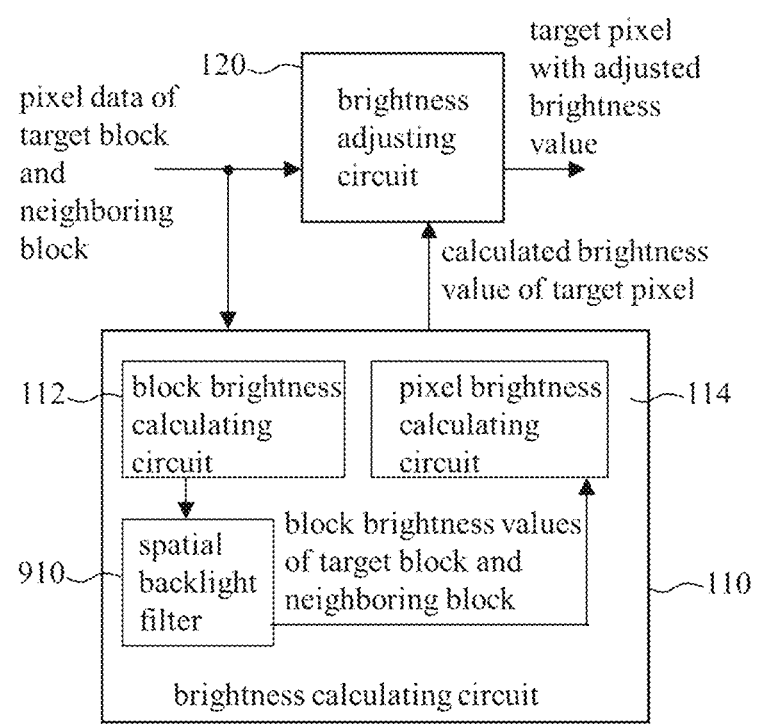
FIG. 9 shows another embodiment of the image tuning device of the present invention.

FIG. 9 shows another embodiment of the image tuning device of the present invention. In comparison with FIG. 1, the brightness calculating circuit 110 of FIG. 9 further includes a spatial backlight filter 910 configured to execute the following steps: multiplying the target block brightness value by a target block weighted value so as to obtain a target block weighted brightness value; multiplying the at least one neighboring block brightness value by at least one neighboring block weighted value respectively so as to obtain at least one neighboring block weighted brightness value; and selecting the maximum value from the target block weighted brightness value and the at least one neighboring block weighted brightness value and thereby updating the target block brightness value by the maximum value. The target block brightness value can be updated in the following exemplary manner: treating the maximum value as the target block brightness value. The aforementioned target block weighted value and the at least one neighboring block weighted value can be set according to the demand of implementation.

Figure 10:
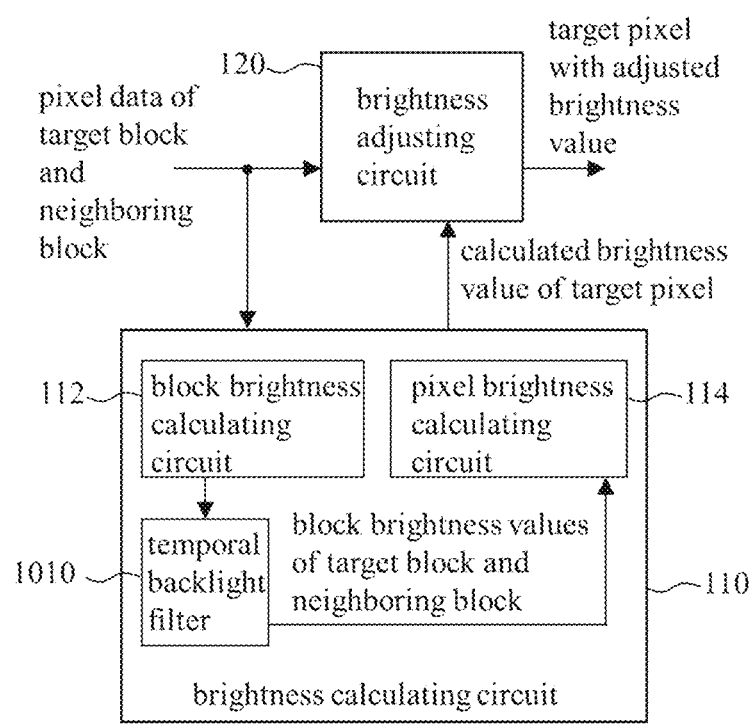
FIG. 10 shows another embodiment of the image tuning device of the present invention.

FIG. 10 shows another embodiment of the image tuning device of the present invention. In comparison with FIG. 1, the brightness calculating circuit 110 of FIG. 10 further includes a temporal backlight filter 1010 configured to execute the following steps: comparing a current frame and a previous frame; and adjusting the target block brightness value of the current frame according to a brightness statistic difference between the whole current frame and the whole previous frame and according to a brightness difference between the target block of the current frame and the target block of the previous frame.

It should be noted that people of ordinary skill in the art can implement the present invention by using some or all of the features of any of the aforementioned embodiments or using some or all of the features of several of the aforementioned embodiments as long as such implementation is practicable, so that the flexibility in carrying out the present invention is achieved.

Figure 11:
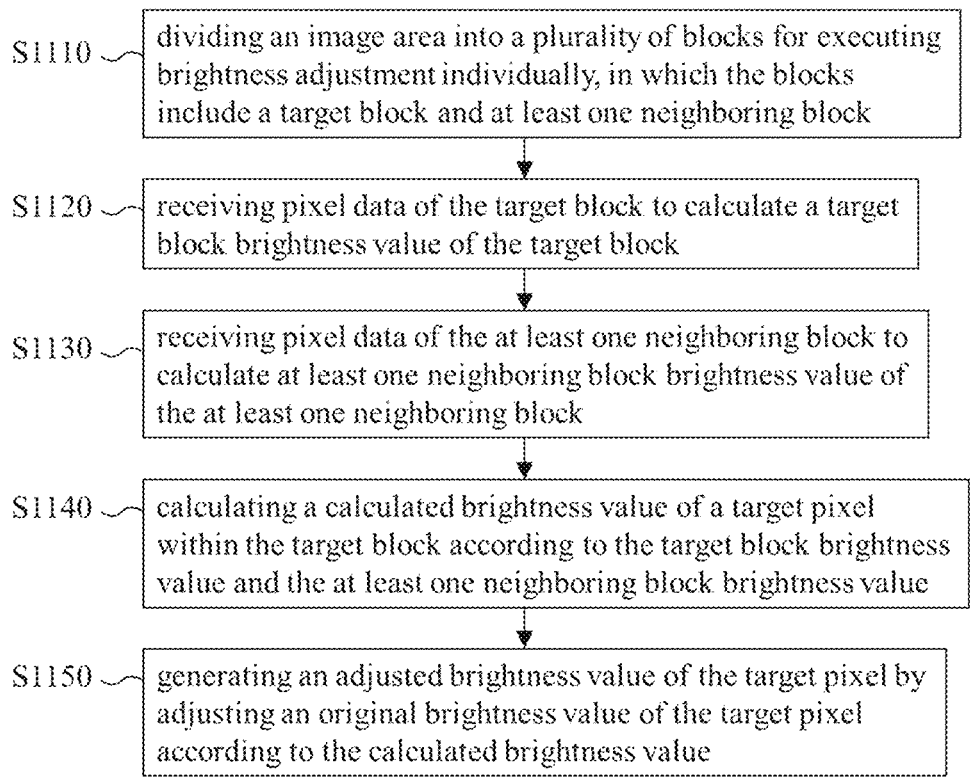
FIG. 11 shows an embodiment of the image tuning method of the present invention.

The present invention also discloses an image tuning method. FIG. 11 shows an embodiment of the image tuning method including the following steps:

Step S1110: dividing an image area into a plurality of blocks for executing brightness adjustment individually, in which the blocks include a target block and at least one neighboring block;

Step S1120: receiving pixel data of the target block to calculate a target block brightness value of the target block;

Step S1130: receiving pixel data of the at least one neighboring block to calculate at least one neighboring block brightness value of the at least one neighboring block;

Step S1140: calculating a calculated brightness value of a target pixel within the target block according to the target block brightness value and the at least one neighboring block brightness value; and Step S1150: generating an adjusted brightness value of the target pixel by adjusting an original brightness value of the target pixel according to the calculated brightness value.

Since people of ordinary skill in the art can appreciate the detail and the modification of the method embodiment of FIG. 11 by referring to the aforementioned device embodiments, which implies that each feature of the device embodiments can be applied to the method embodiment in a reasonable way, repeated and redundant description is omitted.

To sum up, the present invention can adjust the brightness of an image regionally (i.e., adjust the brightness of blocks of an image separately) and thereby increases the contrast of the image and has the image keep details.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. An image tuning device for dividing an image area into a plurality of blocks and executing brightness adjustment on the blocks individually, in which the blocks include a target block and at least one neighboring block, and the image tuning device comprises:
   a brightness calculating circuit including:
      a block brightness calculating circuit configured to receive pixel data of the target block to calculate a target block brightness value of the target block and configured to receive pixel data of the at least one neighboring block to calculate at least one neighboring block brightness value of the at least one neighboring block; and
      a pixel brightness calculating circuit configured to calculate a calculated brightness value of a target pixel within the target block according to the target block brightness value and the at least one neighboring block brightness value; and a brightness adjusting circuit configured to generate an adjusted brightness value of the target pixel by adjusting an original brightness value of the target pixel according to the calculated brightness value of the target pixel.

2. The image tuning device of claim 1, wherein the block brightness calculating circuit is configured to execute at least following steps to obtain the target block brightness value:
gathering statistics according to the pixel data of the target block to obtain target block brightness distribution;
finding out a target block maximum brightness value according to the pixel data of the target block; and
executing a predetermined calculation according to the target block brightness distribution, the target block maximum brightness value and an average brightness value of the target block to obtain the target block brightness value; and the block brightness calculating circuit is configured to execute at least following steps to obtain the at least one neighboring block brightness value:
gathering statistics according to the pixel data of the at least one neighboring block to obtain at least one neighboring block brightness distribution;
finding out at least one neighboring block maximum brightness value according to the pixel data of the at least one neighboring block; and
executing the predetermined calculation or another predetermined calculation according to the at least one neighboring block brightness distribution, the at least one neighboring block maximum brightness value and an average brightness value of the at least one neighboring block to obtain the at least one neighboring block brightness value.

3. The image tuning device of claim 1, wherein the pixel brightness calculating circuit is configured to execute at least following steps to obtain the calculated brightness value of the target pixel: executing a predetermined calculation according to the target block brightness value and the at least one neighboring block brightness value to obtain the calculated brightness value of the target pixel.

4. The image tuning device of claim 1, wherein the pixel brightness calculating circuit is configured to execute at least following steps to obtain the calculated brightness value of the target pixel: generating a target block weighted brightness value according to the target block brightness value and a target block weighted value; generating at least one neighboring block weighted brightness value according to the at least one neighboring block brightness value and at least one neighboring block weighted value; and executing an interpolation calculation according to the target block weighted brightness value and the at least one neighboring block weighted brightness value to obtain the calculated brightness value of the target pixel.

5. The image turning device of claim 1, wherein the brightness adjusting circuit is configured to execute following steps to generate the adjusted brightness value of the target pixel: selecting a brightness adjusting curve from a plurality of predetermined brightness curves according to the calculated brightness value; and adjusting the original brightness value of the target pixel by using the brightness adjusting curve so as to generate the adjusted brightness value of the target pixel.

6. The image tuning device of claim 1, further comprising:
a brightness enhancing circuit configured to generate an output brightness value of the target pixel according to the original brightness value, the calculated brightness value and the adjusted brightness value.

7. The image tuning device of claim 6, wherein the brightness enhancing circuit is configured to execute following steps to generate the output brightness value:
calculating a brightness difference absolute value of a difference between the original brightness value and the calculated brightness value; and
adjusting the adjusted brightness value according to the original brightness value and the brightness difference absolute value to generate the output brightness value.

8. The image tuning device of claim 7, wherein a step of adjusting the adjusted brightness value to determine the output brightness value includes: obtaining an original brightness gain value according to the original brightness value; obtaining a brightness difference gain value according to the brightness difference absolute value; and summing the adjusted brightness value, the original brightness gain value and the brightness difference gain value up to generate the output brightness value.

9. The image tuning device of claim 8, wherein the original brightness gain value is inversely proportionally to the original brightness value, and the brightness difference gain value is inversely proportionally to the brightness difference absolute value.

10. The image tuning device of claim 1, wherein the brightness calculating circuit further includes a decision circuit, the decision circuit is configured to determine whether the target pixel is located at a high frequency region according to the pixel data of the target block so as to generate a decision result, and the brightness adjusting circuit is configured to generate the adjusted brightness value of the target pixel according to the calculated brightness value and the decision result.

11. The image tuning device of claim 1, wherein the brightness calculating circuit further includes a spatial backlight filter configured to execute following steps: multiplying the target block brightness value by a target block weighted value so as to obtain a target block weighted brightness value; multiplying the at least one neighboring block brightness value by at least one neighboring block weighted value respectively so as to obtain at least one neighboring block weighted brightness value; and selecting a maximum value from the target block weighted brightness value and the at least one neighboring block weighted brightness value and thereby updating the target block brightness value by the maximum value.

12. The image tuning device of claim 1, wherein the brightness calculating circuit further includes a temporal backlight filter configured to execute following steps: adjusting the target block brightness value of a current frame according to a brightness statistic difference between the current frame and a previous frame and according to a target block brightness difference between the current frame and the previous frame.

13. An image tuning method comprises following steps:
dividing an image area into a plurality of blocks for executing brightness adjustment individually, in which the blocks include a target block and at least one neighboring block;
receiving pixel data of the target block to calculate a target block brightness value;
receiving pixel data of the at least one neighboring block to calculate at least one neighboring block brightness value;

calculating a calculated brightness value of a target pixel within the target block according to the target block brightness value and the at least one neighboring block brightness value; and generating an adjusted brightness value of the target pixel by adjusting an original brightness value of the target pixel according to the calculated brightness value.

14. The image tuning method of claim 13, wherein a step of calculating the target block brightness value includes:

gathering statistics according to the pixel data of the target block to obtain target block brightness distribution;

finding out a target block maximum brightness value according to the pixel data of the target block;

calculating an average brightness value of the target block according to the pixel data of the target block; and executing a predetermined calculation according to the target block brightness distribution, the target block maximum brightness value and the average brightness value of the target block to obtain the target block brightness value; and a step of calculating the at least one neighboring block brightness value includes:

gathering statistics according to the pixel data of the at least one neighboring block to obtain at least one neighboring block brightness distribution;

finding out at least one neighboring block maximum brightness value according to the pixel data of the at least one neighboring block;

calculating at least one average brightness value of the at least one neighboring block according to the pixel data of the at least one neighboring block; and executing the predetermined calculation or another predetermined calculation according to the at least one neighboring block brightness distribution, the at least one neighboring block maximum brightness value and the average brightness value of the at least one neighboring block to obtain the at least one neighboring block brightness value.

15. The image tuning method of claim 13, wherein a step of calculating the calculated brightness value of the target pixel includes: generating a target block weighted brightness value according to the target block brightness value and a target block weighted value;

generating at least one neighboring block weighted brightness value according to the at least one neighboring block brightness value and at least one neighboring block weighted value;

and executing a predetermined calculation according to the target block weighted brightness value and the at least one neighboring block weighted brightness value to obtain the calculated brightness value of the target pixel.

16. The image turning method of claim 13, wherein a step of generating the adjusted brightness value of the target pixel: selecting a brightness adjusting curve from a plurality of predetermined brightness curves according to the calculated brightness value; and adjusting the original brightness value of the target pixel by using the brightness adjusting curve so as to generate the adjusted brightness value of the target pixel.

17. The image tuning method of claim 13, further including following steps:

calculating a brightness difference absolute value of a difference between the original brightness value and the calculated brightness value; and adjusting the adjusted brightness value according to the original brightness value and the brightness difference absolute value to generate an output brightness value of the target pixel.

18. The image tuning method of claim 13, further comprising following steps:

determining whether the target pixel is located at a high frequency region according to the pixel data of the target block so as to generate a decision result; and generating the adjusted brightness value of the target pixel according to the calculated brightness value and the decision result.

19. The image tuning method of claim 13, further comprising following steps:

multiplying the target block brightness value by a target block weighted value so as to obtain a target block weighted brightness value; multiplying the at least one neighboring block brightness value by at least one neighboring block weighted value respectively so as to obtain at least one neighboring block weighted brightness value; and selecting a maximum value from the target block weighted brightness value and the at least one neighboring block weighted brightness value and thereby updating the target block brightness value by the maximum value.

20. The image tuning method of claim 13, further comprising following steps adjusting the target block brightness value of a current frame according to a brightness statistic difference between the current frame and a previous frame and according to a target block brightness difference between the current frame and the previous frame.

* * * * *